United States Patent

Dillmann

[11] Patent Number: 5,139,735
[45] Date of Patent: Aug. 18, 1992

[54] REACTIVITY CONTROL SYSTEM

[75] Inventor: Charles W. Dillmann, San Jose, Calif.

[73] Assignee: General Electric Company, San Jose, Calif.

[21] Appl. No.: 693,841

[22] Filed: Apr. 30, 1991

Related U.S. Application Data

[63] Continuation-in-part of Ser. No. 553,073, Jul. 10, 1990.

[51] Int. Cl.⁵ .............................................. G21C 7/22
[52] U.S. Cl. .................................. 376/328; 376/219
[58] Field of Search ............... 376/327, 328, 219, 221, 376/239; 976/DIG. 117, DIG. 120, DIG. 130, DIG. 119

[56] References Cited

U.S. PATENT DOCUMENTS

| | | | |
|---|---|---|---|
| 3,510,399 | 5/1970 | Shoichi Terasawa | 376/328 |
| 3,900,365 | 8/1975 | Barclay et al. | 376/219 |
| 4,238,288 | 12/1980 | Anikin et al. | 376/228 |
| 4,423,002 | 12/1983 | Wiart et al. | 376/227 |
| 4,624,825 | 11/1986 | Martin et al. | 376/227 |

OTHER PUBLICATIONS

Wilkins et al, "Advanced BWR: Design Improvements Build on Proven Technology,"Nuclear Engineering International, reprint June 1986, pp. 1-7 and drawing entitled The World's Reactors No 89

Primary Examiner—Brooks H. Hunt
Assistant Examiner—Frederick H. Voss
Attorney, Agent, or Firm—Robert R. Schroeder

[57] ABSTRACT

A reactivity control system includes a reservoir containing a liquid nuclear poison, at least one stationary, hollow control blade extending vertically into a reactor core, and a poison conduit disposed in flow communication between the reservoir and the control blade for channeling the poison between the reservoir and control blade. The level of the poison in the control blade is controlled for selectively varying nuclear reactivity in the core.

14 Claims, 7 Drawing Sheets

REACTIVITY CONTROL SYSTEM

CROSS REFERENCE TO RELATED APPLICATION

This is a continuation-in-part of application Ser. No. 07/553,073, filed Jul. 10, 1990.

TECHNICAL FIELD

The present invention relates generally to a boiling water reactor (BWR), and, more specifically, to a system for controlling nuclear reactivity therein.

BACKGROUND ART

A conventional boiling water reactor includes a reactor pressure vessel within which is disposed a nuclear reactor core having a plurality of fuel bundles. The core is effective for generating heat released from nuclear reactions for boiling water contained in the vessel for generating steam to power a steam turbine for driving, for example, an electrical generator for providing power to a utility grid. The reactor core typically includes a plurality of control rods or blades containing solid nuclear poison which are selectively inserted and withdrawn therefrom by conventional control rod drives (CRDs) for controlling the nuclear reaction rate, or reactivity, within the core. A typical nuclear reactor includes a substantial number of control rods and corresponding control rod drives, for example, over 200 of each. The control rod drives are typically mounted externally of the vessel at either the upper or lower closure head of the vessel and have push rods which extend through the vessel and into the reactor core. Conventional control rod drives either function hydraulically or electro-mechanically for positioning the control rods within the reactor core.

In both the top and bottom mounted control rod drives described above, relatively large apertures through the reactor pressure vessel are required by the drives for translating the control rods, and, therefore, require suitable sealing to prevent leakage of the high pressure water contained in the vessel. Furthermore, bottom mounted CRDs are disposed below the reactor core which complicates maintenance procedures for preventing leakage or draining of the water from the vessel when individual CRDs are removed during maintenance.

Bottom mounted CRDs also require increased servicing area below the vessel which necessarily requires a taller containment building, and attendant increased cost. Since the number of conventional CRDs typically is greater than about 200, the area under the vessel is relatively congested, and requires suitable access areas for required maintenance operations. Conventional recirculation pumps also typically extend from the bottom of the vessel adjacent to the CRDs, which additionally congest the area under the vessel.

On the other hand, top mounted CRDs present the additional problem that all of the service lines to the CRDs must be disconnected and removed prior to removal of the CRDs, and of the upper closure head of the pressure vessel, during maintenance operations which require the removal thereof.

Conventional CRDs also require the ability for obtaining relatively fast insertion of the control rods during a scram condition, which is typically provided by a high pressure accumulator which injects a high pressure driving fluid into the CRDs for quickly inserting the control rods. In the case of bottom mounted CRDs, the scram operation occurs against the force of gravity.

OBJECTS OF THE INVENTION

Accordingly, one object of the present invention is to provide a new and improved reactivity control system.

Another object of the present invention is to provide a reactivity control system which is relatively simple and has few operating components.

Another object of the present invention is to provide a reactivity control system having no moving components within a reactor pressure vessel or large penetrations therefor through the pressure vessel.

Another object of the present invention is to provide a reactivity control system having a scram capability provided at least in part by gravity.

DISCLOSURE OF INVENTION

A reactivity control system includes a reservoir containing a liquid nuclear poison, at least one stationary, hollow control blade extending vertically into a reactor core, and a poison conduit disposed in flow communication between the reservoir and the control blade for channeling the poison between the reservoir and control blade. Means are provided for controlling the level of the poison in the control blade for selectively varying nuclear reactivity in the core.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
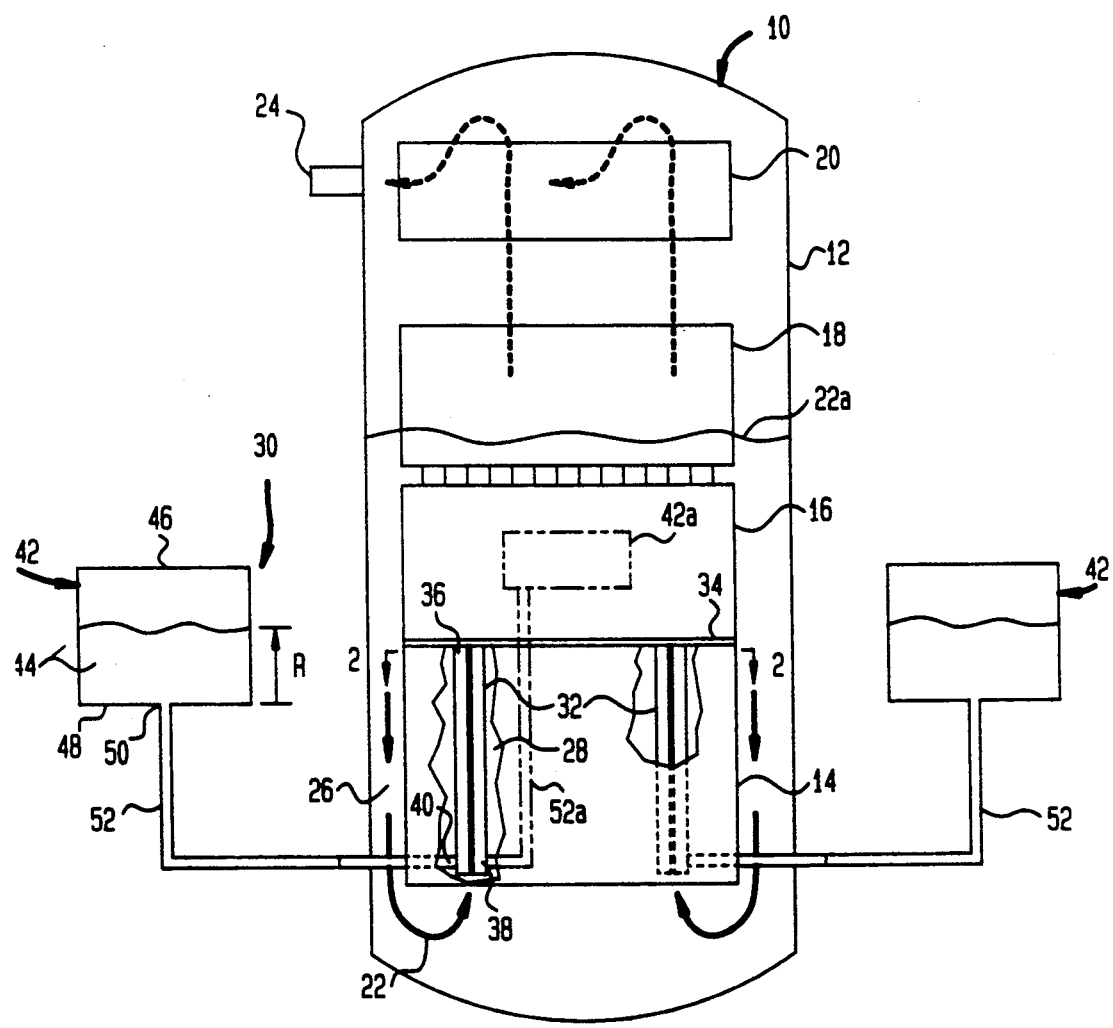
FIG. 1 is a schematic representation of a nuclear reactor including a reactivity control system in accordance with one embodiment of the present invention.

As illustrated schematically in FIG. 1, an exemplary, natural circulation boiling water reactor 10 comprises a pressure vessel 12, a core 14, a chimney 16, a steam separator 18, and a steam dryer 20, all of which are conventional.

Water flows, as indicated by arrows 22, into the core 14 from below. This subcooled water is boiled within the core 14 to yield a water/steam mixture which rises through the chimney 16 to a water level 22a from which the steam is dispelled upwardly. The steam separator 18 helps separate steam from water, and the released steam exits through a steam exit 24 near the top of the vessel 12. Before exiting, any remaining water entrained in the steam is removed by the dryer 20. The separated water is returned down a conventional peripheral downcomer 26 by the force of gravity. The steam in the vessel 12 is at a relatively high steam, or vessel, pressure $P_v$ of about 7.0 MPa, for example.

Figure 2:
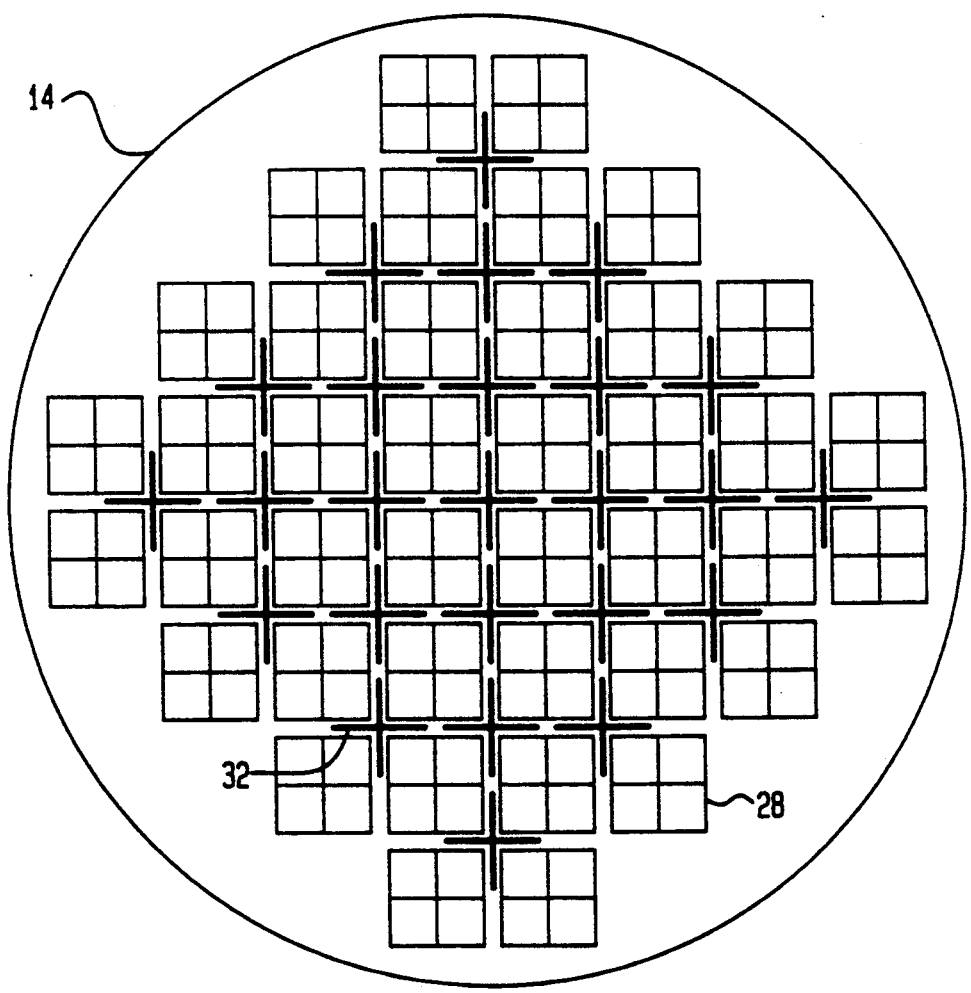
FIG. 2 is a schematic transverse sectional view of the core of the reactor illustrated in FIG. 1 taken along line 2—2.

Referring also to FIG. 2, an exemplary embodiment of the core 14 is illustrated and includes a plurality of vertically extending, conventional square fuel bundles 28 transversely spaced apart in a conventional radial matrix. In a conventional reactor core, vertically movable control rods or blades (not shown) are positioned between adjacent ones of the fuel bundles 28 and are selectively inserted into the core 14 or withdrawn from the core 14 for controlling reactivity therein. The conventional control rods require suitable control rod drives extending into the core from either the top head or the bottom head of the vessel, Which therefore requires relatively large penetrations therein.

Referring to FIG. 1, a reactivity control system 30, in accordance with an exemplary embodiment of the present invention, is illustrated and has no moving parts within the vessel 12 and does not require large penetrations of the vessel 12 for controlling reactivity of the core 16. The control system 30 includes a plurality of fixed, or stationary, hollow control blades 32 which are transversely spaced apart between adjacent ones of the fuel bundles 28 as illustrated in FIG. 2. In this embodiment, the blades 32 extend vertically into the core 16 and are fixedly connected to a top perforated support plate 34 disposed at the top of the core 14. Each of the blades 32 includes a top end 36, a bottom end 38, and a fluid port 40 preferably disposed at the bottom end 38.

The system 30 further includes at least one, and preferably a plurality of reservoirs 42 each containing a conventional liquid nuclear poison solution 44 such as sodium pentaborate in water. Each of the reservoirs 42 has a top end 46, a bottom end 48, and a fluid port 50 preferably disposed at the reservoir bottom end 48, and the reservoir 42 is preferably partially filled with the poison 44 to a vertical reservoir poison level R.

A conventional poison conduit 52 is disposed in flow communication between respective ones of the reservoirs 42 and the blades 32 for channeling the poison 44 between the reservoir 42 and the blade 32. The core 14 includes a substantial number of the control blades 32, for example about 200 thereof, and each of the blades 32 may be provided with its own separate reservoir 42 and poison conduit 52. However, it is preferred that a plurality of transversely spaced apart blades 32 are joined in parallel flow communication through a respective poison conduit 52 and an individual reservoir 42 for reducing the total number of components of the system 30 while providing redundancy of operation therein so that any failure of an individual control system 30, including a respective reservoir 42 and respective control blades 32, will not prevent effective control of the core 14 by the remaining operable reservoirs 42 and control blades 32. Accordingly, the loss of the poison due to leakage in one of the systems 30 would be no worse than a stuck control rod in today's reactors.

Figure 3:
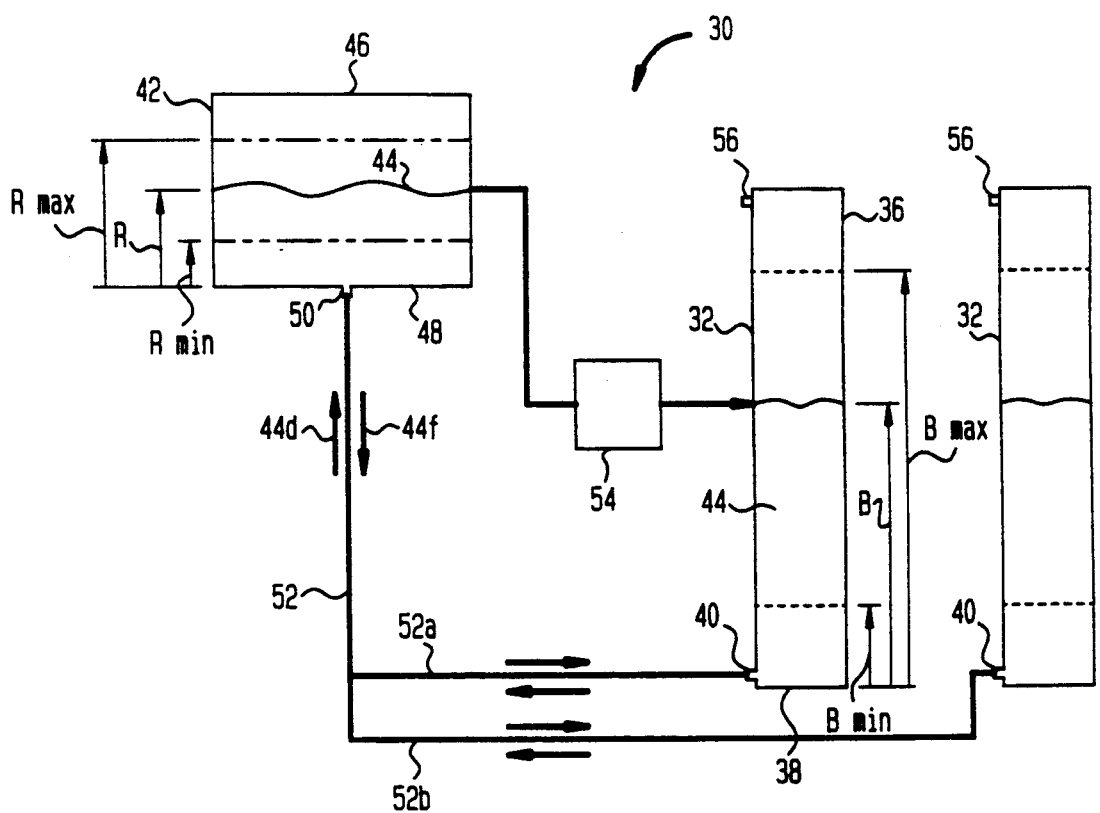
FIG. 3 is a schematic representation of the reactivity control system illustrated in FIG. 1.

More specifically, FIG. 3 illustrates schematically the reactivity control system 30 in accordance with an exemplary embodiment including one of the reservoirs 42 operatively connected to a plurality of the control blades 32 in parallel flow communication therewith, with the poison conduit 52 including respective branches 52a and 52b joined to the control blades 32.

The system 30 also includes means, shown schematically at 54, for controlling or varying the blade poison level B of the poison solution 44 in the blade 32 for selectively varying nuclear reactivity in the core 14. It is to be noted that the blades 32 are preferably positioned in the core 14 as illustrated in FIG. 1 for maintaining the bottom-up reactivity control typically found in current nuclear reactor plants, which is preferred in a boiling water reactor, but do so without bottom penetrations of the vessel 12. Since the control blades 32 are fixed in the core 14, they eliminate all moving components typically associated with a conventional control blade which is conventionally translated vertically into and out of the core 14 through conventional clearances. The present invention, therefore, makes the reactivity control system 30 even more immune to anticipated transient without scram (ATWS) than present nuclear reactor plants. Furthermore, the conventional control rod drives are no longer needed and thus eliminate congestion either under the vessel 12 or over the vessel 12 which would otherwise be required in a conventional control rod drive system. Yet further, the relatively large penetrations through the vessel heads are thusly eliminated since the conventional control rod drives are not used.

In the embodiment of the invention illustrated in FIG. 1, the reservoirs 42 are preferably disposed outside the vessel 12 and the poison conduits 52 extend sealingly through the wall of the vessel 12 using conventional seals which allow the conduits 52 to channel the poison 44 through the vessel wall while preventing the pressurized water 22 inside the vessel 12 from leaking therefrom around the conduit 52 extending through the wall thereof. The resulting penetration of the vessel 12 for the conduit 52 is relatively small, and the sealing of the non-axially movable poison conduit 52 through the vessel wall may be conventionally relatively easily accomplished. This is in contrast to the conventional control rod drives which require relatively large penetrations through the vessel 12 and which must sealingly contain axially translatable shafts therein.

However, as shown in phantom in FIG. 1, the reservoir 42, designated 42A and the poison conduits 52, designated 52A, may be alternatively disposed inside the vessel 12. In either embodiment, the reactivity control system 30 is preferably a substantially closed system in which the poison 44 in the reservoirs 42 and the blades 32 is maintained at a nominal pressure at least as high as the vessel pressure $P_v$ to prevent boiling of the poison 44 in the relatively hot vessel 12. Furthermore, by maintaining the nominal pressure in the blades 32 at least at the vessel pressure $P_v$ or slightly greater, differential pressure loads across the walls of the blades 32 are relatively small, which therefore reduces stress therein. The control system 30 may be maintained at the vessel pressure $P_v$ by a suitable conventional pressurizing pump (not shown) or by suitably pressurizing the blades 32 with an inert gas through a venting port 56, for example, disposed at the blade top end 36 as shown in FIG. 3.

The level B of the poison 44 in the control blades 32 is analogous to position of conventional control rods in a conventional reactor. The system 30 is effective for variably draining the poison 44 from the reservoir 42 for variably filling the control blade 32, filling flow direction designated 44f, for variably reducing reactivity in the core 14. And, the system 30 is effective for variably draining the poison 44 from the control blades 32, drawing flow direction designated 44d, for variably filling the reservoir 42 for increasing reactivity in the core 14. As illustrated in FIG. 3, the level controlling means 54 are effective for varying the blade poison level B between poison minimum level $B_{min}$ adjacent to the blade bottom end 38 to a blade poison maximum level $B_{max}$ adjacent to the blade top end 36. Correspondingly, in the embodiment illustrated in FIG. 3, the reservoir poison level R varies from a maximum level $R_{max}$ to a minimum level $R_{min}$.

In a preferred embodiment of the invention, the level controlling means 54 include disposing the reservoir fluid port 50 at the reservoir bottom end 48, disposing the blade fluid port 40 at the blade bottom end 38, and positioning the reservoir 42 vertically relative to the blades 32 so that the poison 44 in the reservoir 42 may drain by gravity to selectively fill the blades 32 from the minimum level $B_{min}$ to the maximum level $B_{max}$. For example, the vertical position of the reservoir 42 may be selected relative to the vertical position of the blades 32 so that the blade poison maximum level $B_{max}$ is equal to the reservoir poison minimum level $B_{min}$, i.e. same vertical height relative to the blade bottom end 38, which will allow automatic shutdown of the core 14 in the event of a power failure or a loss of signal to the level controlling means 54, as well as allowing scram using at least gravity to fill the poison 44 in the control blades 32 to the maximum level $B_{max}$. In this way, the poison 44 will flow by gravity to fill the control blades 32 to the maximum level $B_{max}$ corresponding to the top of the active fuel in the fuel bundles 28.

The level controlling means 54 may include various configurations for suitably raising and lowering the level of the liquid poison 44 in the control blades 32 which is analogous to inserting and withdrawing conventional solid poison control rods.

Figure 4:
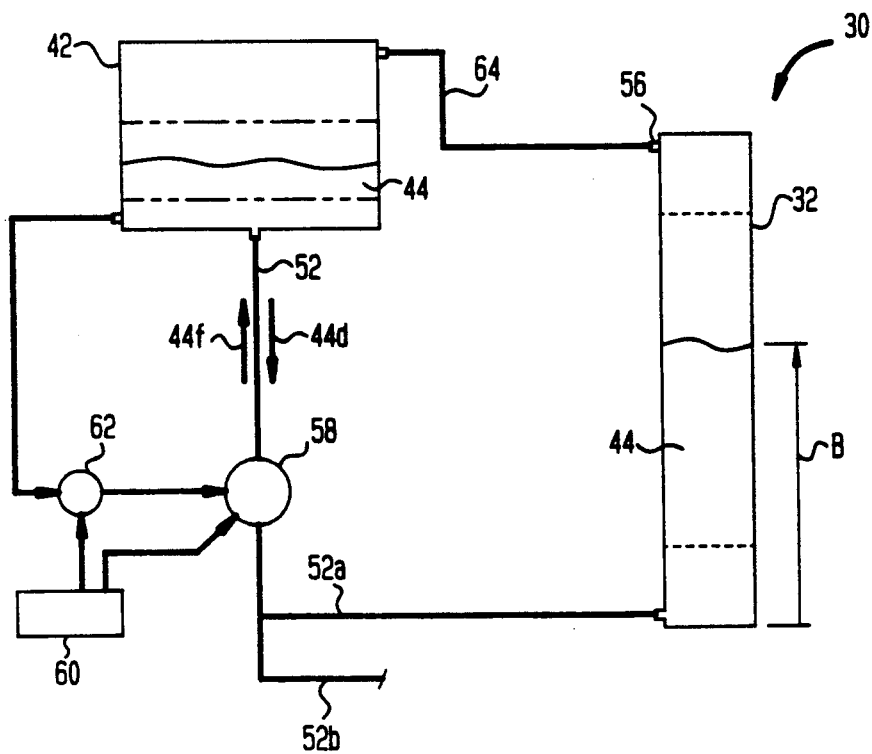
FIG. 4 is a schematic representation of one embodiment of the reactivity control system illustrated in FIG. 3.

Illustrated in FIG. 4 is an exemplary embodiment of the level controlling means 54 including a conventional pump 58 disposed in series flow communication in the poison conduit 52 and operable for selectively pumping the poison 44 between the blade 32 and the reservoir 42. More specifically, a conventional controller 60 is operatively connected to the motor of the pump 58 for selectively varying its output pressure. The pump 58 may be activated for drawing by suction the poison 44 from the control blade 32, through the conduit 52, and pumping the poison 44 upwardly through the conduits 52 and the pump 58 and into the reservoir 42 for decreasing (draining flow 44d) the poison level in the blade 32. As long as the pump 58 is operated for balancing the pressure head of the poison 44 above the pump 58, the blade poison level B may be maintained at any desired level within the blade 32. By decreasing the output pressure of the pump 58, the poison 44 will be allowed by gravity to drain from the reservoir 42, through the pump 58, and into the blade 32 (filling flow 44f) for increasing the blade poison level B. In the event of a power failure to the pump 58, it will stop and the pressure head of the poison 44 in the reservoir 42 relative to the blade 32 will cause an automatic scram operation for raising the blade poison level to its maximum poison level $B_{max}$.

As illustrated schematically in FIG. 4, the pump 58 may be a conventional centrifugal pump, or may be a conventional fluid-driven eductor or jet pump. In the form of an eductor, the pump 58 would further include a conventional mechanical, for example centrifugal, pump 62 suitably disposed in flow communication between the reservoir 42 and the eductor pump 58 and operatively connected to the control 62. In this way, a portion of the poison 44 may be channeled from the reservoir 42, pressurized by the pump 62 and ejected as a jet in the eductor pump 58 for creating a variable-pressure suction at its inlet for drawing the poison 44 from the blade 32, and a pressure rise at its outlet to pump the poison 44 into the reservoir 42. In this embodiment, a venting conduit 64 is disposed in flow communication between the blade venting port 54 and the reservoir 42 for allowing the poison 44 to flow freely between the reservoir 42 and the blade 32 in response to operation of the pump 58.

Figure 5:
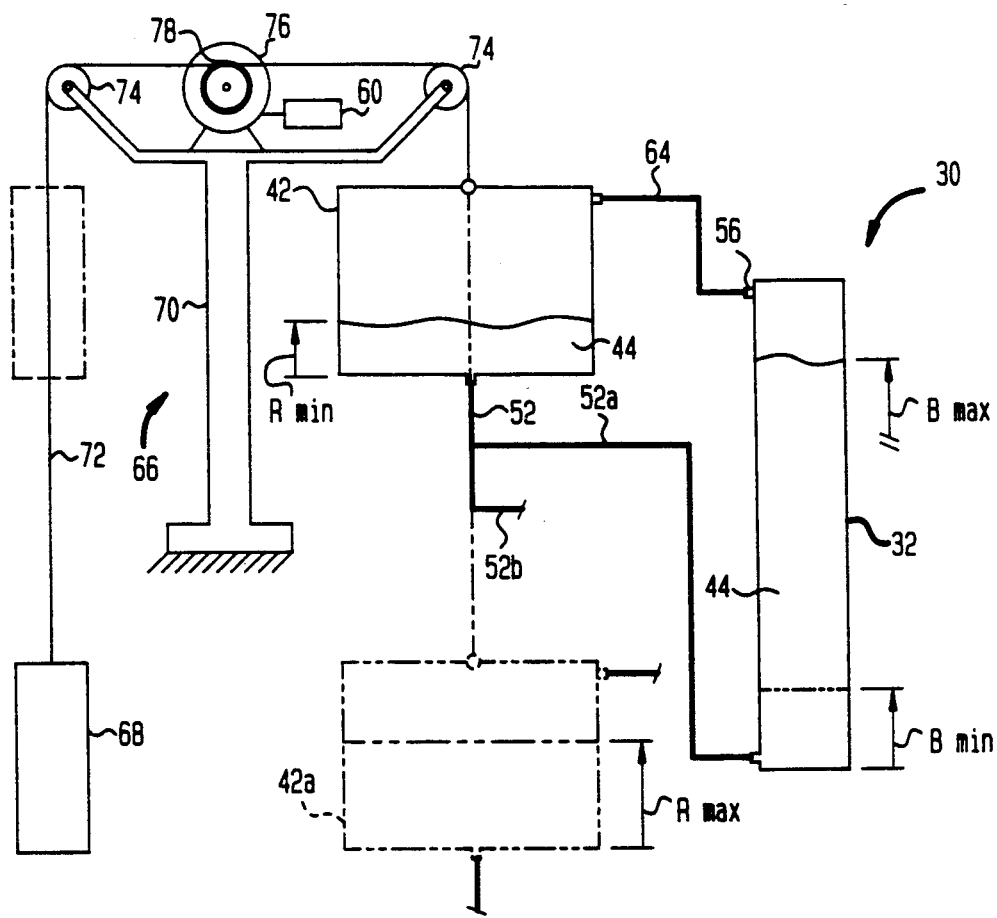
FIG. 5 is a schematic representation of another embodiment of the reactivity control system illustrated in FIG. 3.

Illustrated in FIG. 5 is another embodiment of the level controlling means 54 which include means 66 for selectively moving the entire reservoir 42 upwardly relative to the blade 32 for allowing gravity to drain the poison 44 from the reservoir 42 and into the blade 32. The reservoir 42 is shown in its maximum upward position with the reservoir poison minimum level $R_{min}$ being at the same vertical height as the blade poison maximum level $B_{max}$.

The moving means 66 are also effective for moving downwardly the reservoir 42 relative to the blade 32 for allowing gravity to drain the poison 44 from the blade 32 and into the reservoir 42. The reservoir 42 is shown in phantom line designated 42a at its lowermost position with the poison 44 therein being disposed at the reservoir poison maximum level $R_{max}$, which is at the same vertical height as the blade poison minimum level $B_{min}$. The conduits 52 (e.g. 52a, 52b) and 64 are suitably flexible for moving with the reservoir 42.

The reservoir moving means 66 may include a counterweight 68 operatively connected to the reservoir 42 and having a weight greater than the weight of the reservoir 42 and the poison 44 therein so that the counterweight 68 is effective for raising the reservoir 42 by gravity to fill the blade 32 with the poison 44 drained from the reservoir, for example during a scram operation or loss of power. The moving means 66 may include a suitable stationary support 70, a cable 72 fixedly joined between the counterweight 68 and the reservoir 42, pulleys 74 over which the cable 72 is suspended, and a conventional electrical drive motor 76 having a drive pulley 78 around which a portion of the cable 72 is positioned. The motor 76 is operatively connected to the controller 60 for rotating the pulley 78 in either of two opposite directions for moving the cable 72 and the reservoir 42 upwardly in one direction, and downwardly in the other direction. Upon a loss of power to the motor 76, the counterweight 68 is effective for rotating the motor 78 by gravity and lifting the reservoir 42 to its maximum elevation.

Figure 6:
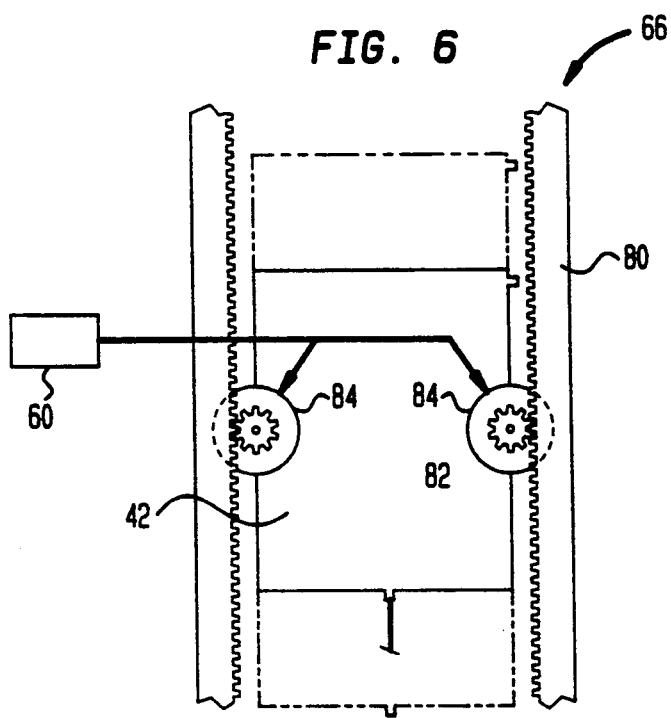
FIG. 6 is a schematic representation of another embodiment of the reservoir positioning means illustrated in FIG. 5.

Illustrated in FIG. 6 is another embodiment of the reservoir moving means 66 which include conventional racks 80 and pinions 82, with the pinions 82 being powered by conventional electrical motors 84 which are operatively connected to the controller 60. The motors 84 and pinions 82 are suitably fixedly connected to the reservoir 42 and are suitably rotated for raising and lowering the reservoir 42 as desired.

Figure 7:
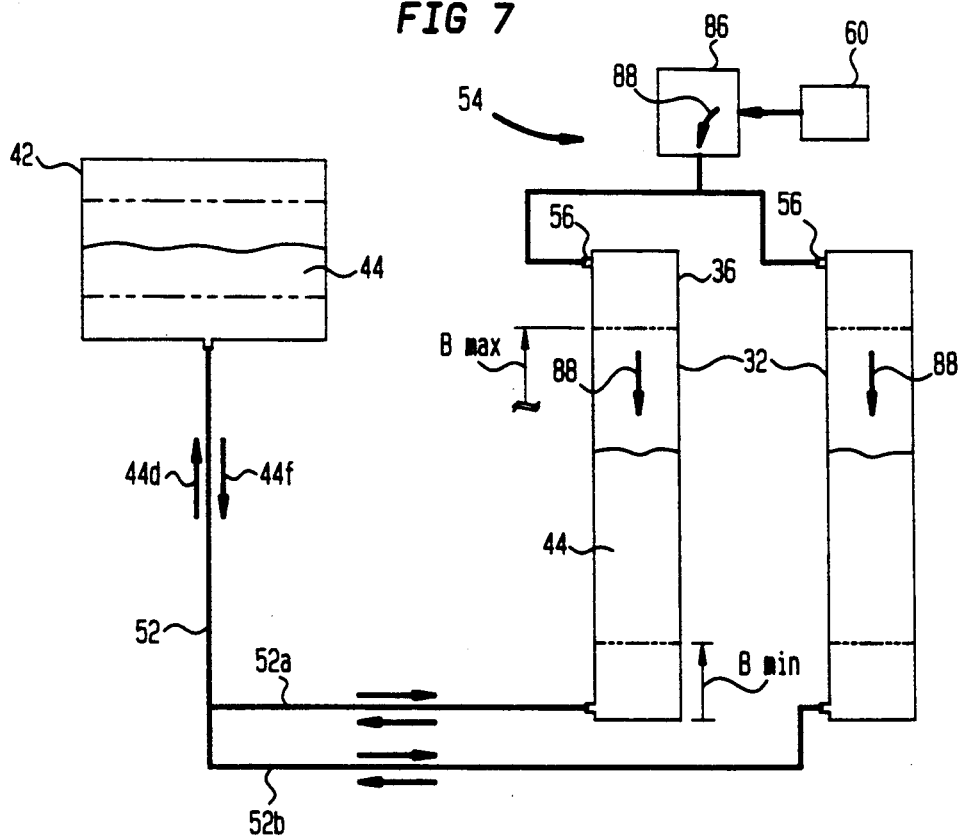
FIG. 7 is a schematic representation of another embodiment of the reactivity control system illustrated in FIG. 3.

Illustrated in FIG. 7 is another embodiment of the level controlling means 54. In this embodiment, the means 54 include the blades 32 having the venting ports 56 at the top ends thereof, and means 86 for selectively pressurizing the poison 44 in the blades 32 through the venting ports 56 for dispelling the poison 44 from the blades 32 and into the reservoir 42 through the conduits 52 for selectively varying the poison level in the blades 32.

In an exemplary embodiment, the poison pressurizing means 86 is effective for selectively providing a non-poison displacing fluid 88 into the blade 32 through the venting port 56 at selectively varying pressure for displacing downwardly the poison 44 in the blade 32. The poison pressurizing means 86 are effective for selectively pressurizing the displacing fluid 88 from a minimum pressure, for example a zero gauge pressure, allowing the poison 44 in the blade 32 to reach the blade poison maximum level $B_{max}$, and to a maximum pressure for displacing the poison downwardly in the blade 32 to reach the blade poison minimum level $B_{min}$. The displaced poison 44 is channeled through the poison conduit 52 and into the reservoir 44. Both the minimum and maximum pressures of the displacing fluid 88 are preferably greater than the vessel pressure $P_v$ to provide an over-pressure in the preferably closed system 30 illustrated in FIG. 7 to prevent boiling of the poison 44, so that boiling does not occur even during a severe accident. The reservoir 42 is preferably a container disposed external of the vessel 12 (see FIG. 1) and may be maintained at a pressure equal to or greater than the vessel pressure $P_v$.

Figure 8:
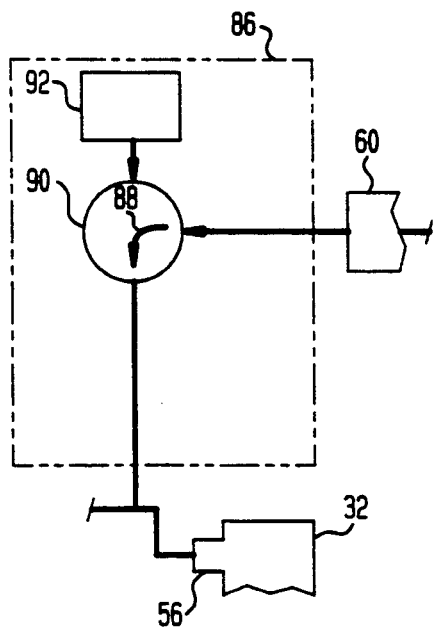
FIG. 8 is a schematic representation of one embodiment of the displacing fluid pressurizing means illustrated in FIG. 7.

As illustrated in FIG. 8, the poison pressurizing means 86 may include a conventional variable output pump 90 disposed in flow communication between the venting port 56 and a conventional source 92 for the displacing fluid 88. The pump 90 is operatively connected to the controller 60 for selectively varying the output pressure of the displacing fluid 88 from the pump 90.

Figure 9:
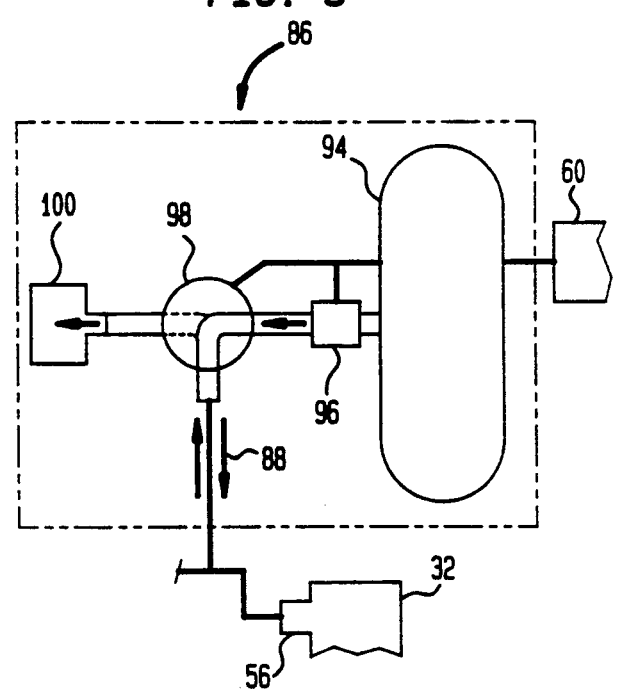
FIG. 9 is a schematic representation of another embodiment of the displacing fluid pressurizing means illustrated in FIG. 7.

Illustrated in FIG. 9 is another embodiment of the poison pressurizing means 86. In this embodiment, the poison 44 is displaced from the blade 32 and into the reservoir 42 external of the vessel 12 (as shown in FIG. 1) by the displacing fluid 88 in the form of a gas such as nitrogen. Also in this embodiment, a conventional accumulator 94 is provided for storing the displacing gas 88 at a pressure substantially greater than the maximum pressure required for displacing the poison 44 downwardly in the blade 32 in order to store a large amount of the gas 88 in the accumulator 94. A conventional regulator 96 is disposed in flow communication with the accumulator 94 for selectively varying the pressure of the displacing gas 88 channeled from the accumulator 94 to the blade 32. A conventional control valve 98 is disposed in flow communication between the regulator 96 and the blade 32 for selectively joining the venting port 56 to the regulator 96 to provide the pressurized displacing gas 88 to the blade 32 for lowering the poison level therein.

The control valve 98 is also operable for selectively joining the venting port 56 to a conventional low pressure dump 100 while interrupting flow of the displacing gas 88 from the regulator 96 to the venting port 56 for reducing, by venting, the pressure inside the blade 32 for raising the poison level up to the blade maximum poison level $B_{max}$. The regulator 96 and the control valve 98 are operatively connected to the controller 60 for selectively varying the pressure of the displacing gas 88 inside the control blade 32 for controlling the level of the poison 44 therein. The control valve 98 preferably dumps the displacing gas 88 from the control blade 32 upon interruption of power or signal thereto for ensuring automatic scram operation.

The control blades 32 indicated schematically in the several Figures described above may have any suitable transverse configuration or cross section. For example, as illustrated in FIG. 2, the control blade 32 may have a cruciform transverse configuration when used with the square fuel bundles 28.

Figure 10:
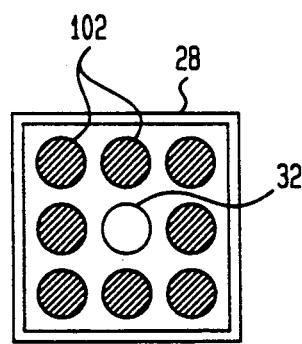
FIG. 10 is a schematic representation of a transverse sectional view of the fuel bundles illustrated in FIGS. 1 and 2 in accordance with another embodiment of the present invention.

Furthermore, although the control blade 32 may be positioned between adjacent ones of the fuel bundles 28 as illustrated in FIG. 2, the blades 32 may alternatively be formed directly within an individual fuel bundle 28. For example, as illustrated schematically in FIG. 10, the fuel bundle 28 includes a plurality of conventional fuel rods 102, and the control blades 32 (one shown for example) may be fixedly positioned therein between adjacent ones of the fuel rods 102. In this exemplary embodiment, the control blade 32 has a circular transverse configuration.

Figure 11:
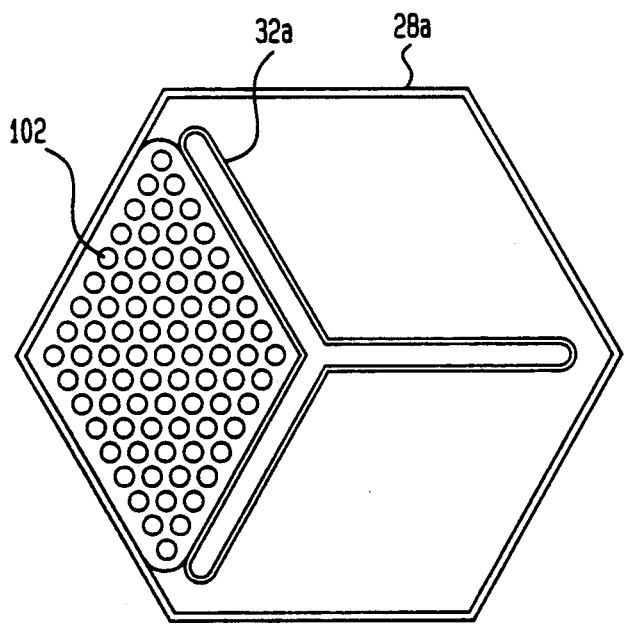
FIG. 11 is a schematic representation of a transverse sectional view of another embodiment of a fuel bundle and control blade usable in the reactivity control system of the present invention.

Illustrated in FIG. 11 is a hexagonal fuel bundle designated 28a, with the control blade, designated 32a having a Y-shaped transverse configuration and fixedly positioned between the fuel rods 102.

Figure 12:
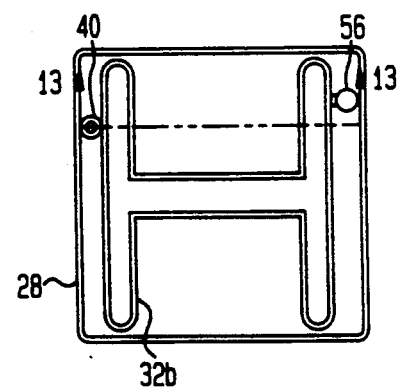
FIG. 12 is a schematic representation of a transverse sectional view of a fuel bundle and control blade in accordance with another embodiment of the present invention.
Figure 13:
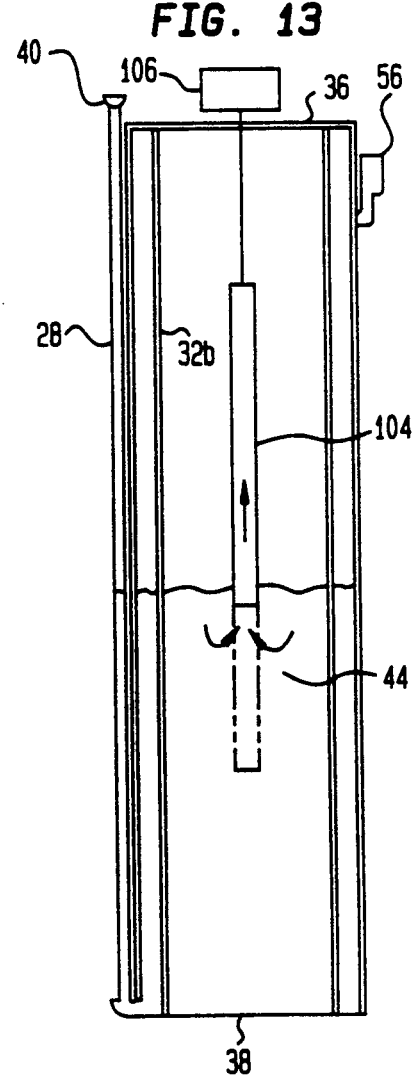
FIG. 13 is an elevation sectional view of the fuel bundle and control blade illustrated in FIG. 12 taken along line 13—13.

Illustrated in FIGS. 12 and 13, is another embodiment of the square shaped fuel bundle 28 including the control blade 32 designated 32b, having an H-shaped transverse configuration fixedly disposed inside the fuel bundle 28. In this embodiment, the blade fluid port 40 extends from the bottom end 38 of the control blade 32b to the top end 36 for allowing easy access to fill or drain the blade 32b from the top thereof. The venting port 56 is again disposed at the blade top end 36.

For the embodiment illustrated in FIGS. 12 and 13, the poison 44 may alternatively be selectively pumped into the control blade 32b through the port 56 to selectively fill the blade 32b, and be selectively withdrawn from the blade 32b by suction through the port 40 from a separate suction pump.

Yet another embodiment may include a vertically moveable suction tube 104, shown schematically in FIG. 13, which can be hooked to a device similar to a conventional traversing incore probe (TIP) positioner 106 for drawing out the poison 44 from the blade 32b to control, or decrease, the level therein. The poison is selectively pumped into the blade 32b through the port 56 to control, or increase, the level therein.

Yet further, a hexagonal fuel bundle can employ a fixed hollow-wall control element with a star shape. Yet another option would be a matrix of tubes similar to a pin-type control element. In other embodiments, control elements may comprise a series of tubes like the one shown in FIG. 10. In some embodiments, sufficient wall thickness may be used to withstand full reactor vessel pressure. In still further embodiments, control elements may have thin walls with structural reinforcing ribs to accommodate the pressure loads thereacross.

Figure 14:
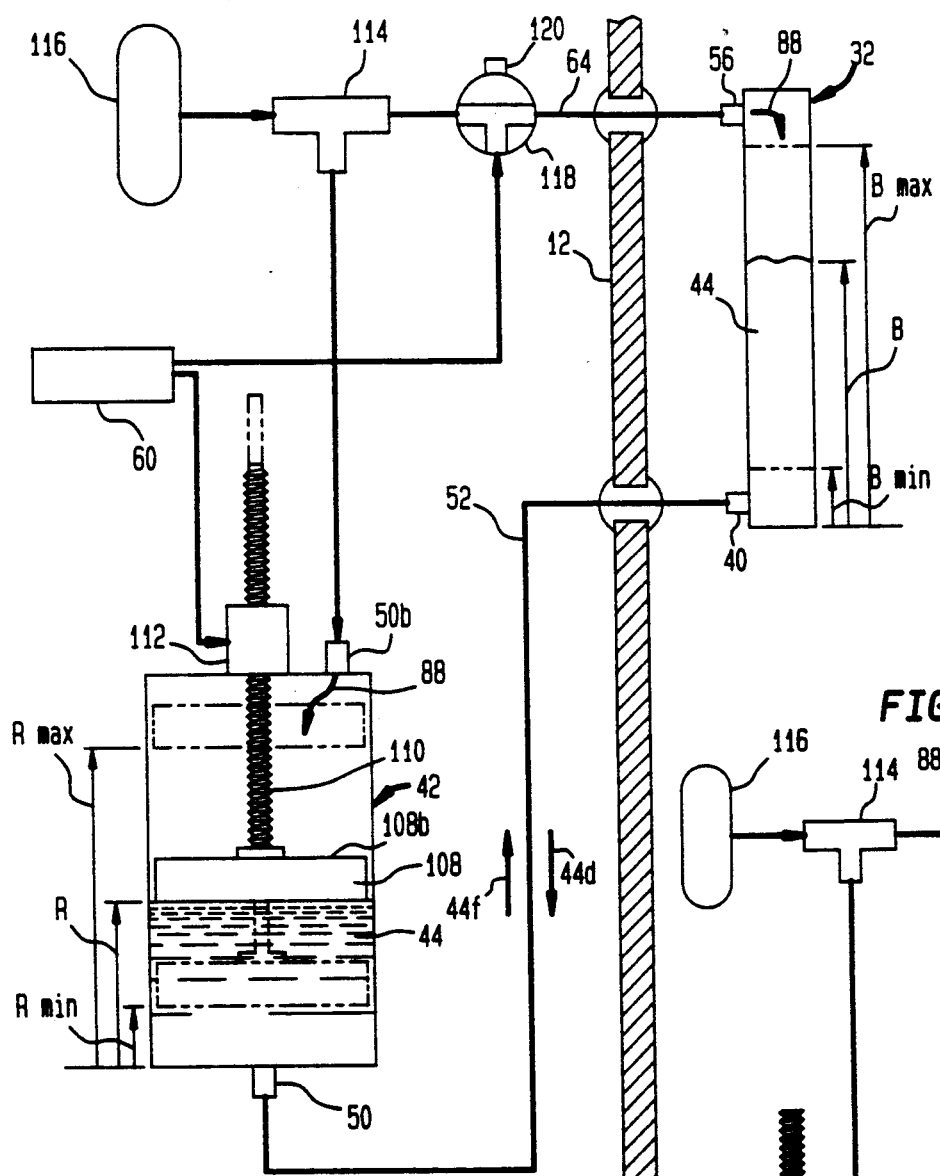
FIG. 14 is a schematic representation of another embodiment of the reactivity control system illustrated in FIG. 1.
Figure 15:
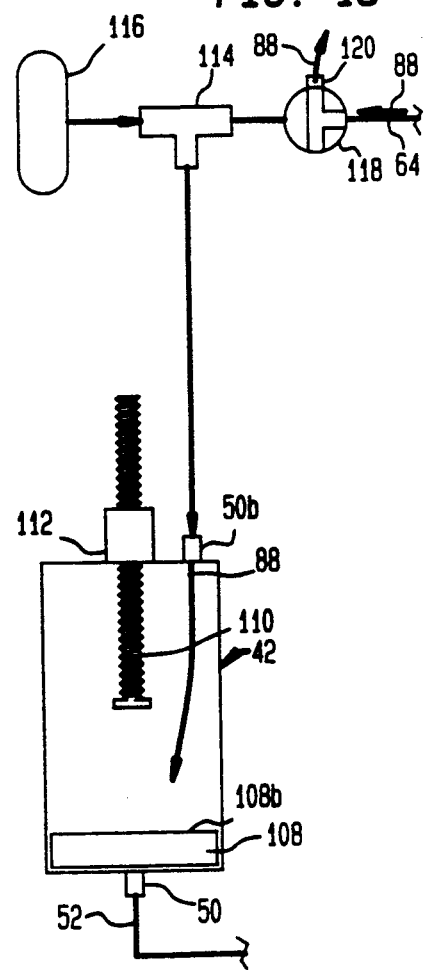
FIG. 15 is a view of a portion of the reactivity control system illustrated in FIG. 14 showing the piston displaced downwardly by a pressurized gas.

Illustrated in FIGS. 14 and 15 is yet another embodiment of the invention which may be used for obtaining fine positioning of the poison level B in the control blades 32. The reservoir 42 is preferably disposed vertically below the blade 32 so that the poison 44 in the blade 32 may drain by gravity from the blade 32 and into the reservoir 42. The reservoir 42 includes a piston 108 for confining the poison 44 and against which the poison 44 exerts a pressure force upwardly due to the weight of the poison 44 in the blade 32.

The piston 108 is selectively positionable vertically by a vertically positionable rod 110, in the exemplary form of a screw, having a distal end 110b disposed in contact with a top surface 108b of the piston 108 for controlling the vertical position of the piston 108 and the reservoir poison level R. A conventional motor 112, through which the screw 110 extends, rotates the screw 110 either clockwise or counterclockwise in response to the controller 60 operatively connected thereto.

The reservoir includes a top fluid port 50b joined to a tee fitting 114 in flow communication with a conventional accumulator 116 containing a pressurized gas, such as the non-poison fluid 88, nitrogen for example. The tee 114 is also joined to a conventional, selectively positionable valve 118 operatively connected to the controller 60. The valve 118 is also operatively connected to the blade venting port 56 by the venting conduit 64, and includes an exhaust port 120 connected to atmosphere.

In normal operation, the pressurized gas 88 flows from the accumulator 116 to the tee 114 and into the reservoir 42, and the valve 118 is positioned to channel a portion of the pressurized gas 88 from the tee 114 to the blade 32 for maintaining an equal pressure therein above the respective poison levels B and R to prevent boiling of the poison 44, as shown in FIG. 14. The screw 110 is selectively screwed downwardly for driving the piston 108 downwardly to force or pump the poison 44 out the port 50, through the conduit 52 and into the blade 32 to fill it. The screw 110 may also be screwed in the opposite direction, upwardly, for allowing the pressure head of the poison 44 to raise the piston 108 upwardly against the elevated screw distal end 110b for allowing the poison 44 to drain from the blade 32 into the reservoir 42.

In this way, the poison level B in the blade 32 may be selectively varied from its minimum value $B_{min}$ to its maximum value $B_{max}$ while the piston 108 is moved vertically for changing the reservoir poison level R from its maximum level $R_{max}$ to its minimum level $R_{min}$, respectively.

In a scram operation, the valve 118 is positioned by the controller 60 to block flow from the tee 114, as shown in FIG. 15, and to join the conduit 64 to the exhaust port 120 to exhaust the gas 88 from the blade 32. The gas 88 continues to be discharged into the reservoir 42 from the tee 114 causing a pressure imbalance between the reservoir 42 and the blade 32. The gas 88 acts against the piston top surface 108b to drive the piston 108 downwardly for draining the reservoir 42 to fill the blade 32.

In all of the embodiments of the invention disclosed above, the position, or level B of the poison 44 within the control blades 32 may be obtained by any suitable means, such as, for example direct measurement of the level of the poison 44 in the control blades 32. Or, alternatively, the level R of the poison 44 in the reservoir 42 may be measured to indicate the respective level B of the poison 44 in the control blades 32. In the embodiment of the invention illustrated in FIG. 4, the performance curves of the pump 58 may be used to determine the level of the poison 44 in the control blades 32 since the output pressure of the pump 58 determines the level R of the poison 44 in the reservoir 42 being elevated above the pump 58. For the embodiments of the invention illustrated in FIGS. 7-9, the pressure of the displacing fluid 88 may be conventionally sensed which is directly proportional to the level B of the poison 44 in the control blades 32 being displaced thereby.

For conventional refueling of the core 16, the blades 32 are filled with the poison 44 to at least the maximum level $B_{max}$, and the fluid ports 40 and 56 are conventionally plugged so that there is permanent suppression of the reactivity of the fuel bundles 28. In the embodiments of the blades 32 fixedly joined inside the fuel bundles 28, they may be removed together as a unit from the core 16.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is claimed and desired to be secured by Letters Patent of the United States is the invention as defined and differentiated in the following claims:

1. A system for controlling nuclear reactivity in a nuclear reactor vessel having a reactor core for boiling water to produce stream in said vessel at a vessel pressure comprising:

a reservoir having a top end, a bottom end, a fluid port, and filled with a liquid nuclear poison to a level therein;

a stationary, hollow control blade extending vertically into said core, and including a top end, a bottom end, and a fluid port;

a poison conduit disposed in flow communication between said reservoir and said blade fluid ports for channeling said poison between said reservoir and said blade; and means for controlling level of said poison in said blade for selectively varying nuclear reactivity in said core by variably draining said poison from said reservoir through said poison conduit for variably filling said blade for variably reducing reactivity in said core, and by variably draining said poison from said blade through said poison conduit for variably filling said reservoir for increasing reactivity in said core, said blade poison level being variable between a poison minimal level and a poison maximum level, and said level controlling means including a pump disposed in series flow communication in said poison conduit and operable for selectively pumping said poison between said blade and said reservoir.

2. A reactivity control system according to claim 1 wherein said level controlling means include disposing said reservoir fluid port at said reservoir bottom end, disposing said blade fluid port at said blade bottom end, and positioning said reservoir vertically relative to said blade so that said poison in said reservoir may drain by gravity to fill said blade to said poison maximum level.

3. A reactivity control system according to claim 2 wherein said reservoir is disposed outside said vessel and said poison conduit extends sealingly through said vessel.

4. A reactivity control system according to claim 2 wherein said reservoir is disposed inside said vessel.

5. A reactivity control system according to claim 2 wherein said poison in said reservoir and in said blade is maintained at a pressure at least as high as said vessel pressure.

6. A reactivity control system according to claim 1 wherein said pump is effective for drawing said poison from said blade and pumping said poison into said reservoir for decreasing said poison in said blade, and for allowing gravity to drain said poison from said reservoir and into said blade.

7. A reactivity control system according to claim 6 wherein said pump comprises a fluid-driven eductor.

8. A reactivity control system according to claim 2 wherein said blade has a cruciform transverse configuration.

9. A reactivity control system according to claim 2 wherein said blade has an H-shaped transverse configuration.

10. A reactivity control system according to claim 2 wherein said blade has a Y-shaped transverse configuration.

11. A reactivity control system according to claim 2 wherein said blade has a circular transverse configuration.

12. A reactivity control system according to claim 2 wherein said core includes a plurality of transversely spaced apart fuel bundles and said blade is positioned between adjacent ones thereof.

13. A reactivity control system according to claim 2 wherein said core includes a plurality of transversely spaced apart fuel bundles and said blade is fixedly positioned in one of said fuel bundles.

14. A reactivity control system according to claim 7 further including a second pump disposed in flow communication between said reservoir and said eductor pump for receiving and pressurizing a portion of said poison from said reservoir and ejecting said poison portion in said eductor pump for pumping said poison from said blade into said reservoir.

* * * * *